(12) United States Patent
Wilks

(10) Patent No.: US 12,421,059 B2
(45) Date of Patent: Sep. 23, 2025

(54) SYSTEMS AND METHODS FOR SILICA DUST REDUCTION AT WELL SITES

(71) Applicant: ProFrac Services, LLC, Willow Park, TX (US)

(72) Inventor: Matthew Wilks, Cisco, TX (US)

(73) Assignee: ProFrac Services, LLC, Willow Park, TX (US)

( * ) Notice: Subject to any disclaimer, the term of this patent is extended or adjusted under 35 U.S.C. 154(b) by 421 days.

(21) Appl. No.: 17/681,428

(22) Filed: Feb. 25, 2022

(65) Prior Publication Data

US 2022/0274793 A1 Sep. 1, 2022

Related U.S. Application Data

(60) Provisional application No. 63/154,117, filed on Feb. 26, 2021.

(51) Int. Cl.
*B65G 69/18* (2006.01)

(52) U.S. Cl.
CPC .................. *B65G 69/188* (2013.01)

(58) Field of Classification Search
USPC ............................................. 406/46, 47, 48
See application file for complete search history.

(56) References Cited

U.S. PATENT DOCUMENTS

| | | | | |
|---|---|---|---|---|
| 1,350,337 | A * | 8/1920 | Rhodes | C10B 31/00 201/37 |
| 2,754,155 | A * | 7/1956 | Kempthorne | B65G 53/526 19/66 CC |
| 10,001,002 | B2 * | 6/2018 | Fisher | E21B 43/267 |
| 10,668,440 | B2 * | 6/2020 | Green | B01F 33/5023 |
| 10,738,193 | B1 * | 8/2020 | Hicks | C09C 1/3063 |
| 10,815,078 | B2 * | 10/2020 | Stark | B65G 53/60 |
| 2004/0229329 | A1 | 11/2004 | Becker et al. | |
| 2015/0368039 | A1 * | 12/2015 | Cochrum | B65D 88/66 406/75 |
| 2016/0251570 | A1 * | 9/2016 | Hook | C09K 8/805 507/225 |
| 2018/0178999 | A1 * | 6/2018 | Sherwood | B65G 15/00 |

FOREIGN PATENT DOCUMENTS

| | | |
|---|---|---|
| CN | 211945459 U | 11/2020 |
| JP | 2019043071 A | 3/2019 |

OTHER PUBLICATIONS

International Search Report and Written Opinion dated Jul. 5, 2022 for Application No. PCT/US2022/70833.

\* cited by examiner

*Primary Examiner* — William R Harp
(74) *Attorney, Agent, or Firm* — Henry Patent Law Firm PLLC

(57) ABSTRACT

Systems and methods for silica dust reduction at well sites are described herein. The system can include a blower, a transfer hose having a first end connected to the blower, a second end connected to a hopper containing a granular material, and an interior volume. The system can also include a supply of dust suppression solution in fluid communication with the interior volume of the transfer hose.

25 Claims, 4 Drawing Sheets

SYSTEMS AND METHODS FOR SILICA DUST REDUCTION AT WELL SITES

CROSS-REFERENCE TO RELATED APPLICATIONS

This application claims benefit of U.S. Provisional Patent Application No. 63/154,117, filed Feb. 26, 2021, which is herein incorporated by reference in its entirety.

BACKGROUND

Hydraulic Fracturing is oftentimes used in oil and gas well completions to enhance production by inducing fractures in a subterranean formation. Such fracturing is oftentimes accomplished by injecting a mixture of fluid, usually water, and a proppant material, such as sand, into the induced fractures.

Field operators may oftentimes handle frac sand during various stages of the hydraulic fracturing process at or near the well site. The frac sand, as it moves through these various stages of the hydraulic fracturing process, may generate respirable silica particles, or silica dust, that may be released into the surrounding nearby atmosphere. The field operators in the vicinity of the well site may be highly exposed to this silica dust. According to health studies, silica dust may cause certain health problems to those field operators when inhaled.

There have been several attempts at controlling and mitigating silica dust at a well site. However, such attempts have required use of additional equipment either to attempt to hermetically seal off the silica dust from the outside environment or to create a negative pressure or vacuum to remove silica dust. Each solution adds complexity and cost to the hydraulic fracturing process and may not remove enough silica dust for compliance with Occupational Safety and Health Administration (OSHA's) permissible exposure limits (PEL). What is needed, therefore, is a low cost solution for removing frac sand that can be easily adapted to existing frac sand transportation systems.

BRIEF SUMMARY

A system for silica dust reduction at well sites is described herein. The system can include a blower, a transfer hose having a first end connected to the blower, a second end connected to a hopper containing a granular material, and an interior volume. The system can also include a supply of dust suppression solution in fluid communication with the interior volume of the transfer hose.

A system for transferring frac sand from a tractor trailer bed to a silo located at a well site is also described herein. The system can include a first transfer hose having a first end, a second end, and a first interior volume. The system can also include a misting system in fluid communication with the first interior volume of the first transfer hose. A blower can be connected to the first end of the first transfer hose. The system can also include a second transfer hose having a first end, a second end, and a second interior volume. A tractor trailer can be connected to the second end of the first transfer hose and the first end of the second transfer hose. A silo can be connected to the second end of the second transfer hose.

A method for silica dust reduction at well sites is also described herein. The method can include transferring frac sand from a tractor trailer bed to a silo located at a well site. In particular, the method can include introducing compressed air into an interior volume of a first transfer hose via a blower. The method can also include introducing a dust suppression solution into the interior volume of the first transfer hose. The method can also include mixing the compressed air with the dust suppression solution to provide a compressed dust suppression solution mixture. The method can further include contracting the compressed dust suppression solution mixture with frac sand to provide a coated frac sand. The method can also include introducing the coated frac sand into a silo.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

The present disclosure is directed to systems and methods for silica dust reduction at well sites. In particular, the present disclosure relates to a system for deploying granular material, the system containing an apparatus for deploying a dust suppression solution onto the granular material to mitigate particulate dust, specifically silica dust.

Unless specifically defined herein, all technical and scientific terms used have the same meaning as commonly understood by one of ordinary skill in the art to which this invention belongs. The term "granular material," as used herein, means a flowable material comprising solid macroscopic particles, such as sand, gravel, or the like.

The term "proppant," as used herein, means material that includes one or more (e.g., tens, hundreds, thousands, millions, or more) of individual proppant particles, particulates or elements.

The term "frac sand," as used herein, means silica sand used as in a hydraulic fracturing process.

The term "silica dust" (also referred to as "dust" or "respirable silica"), as used herein, means respirable or inhalable silica dioxide particles.

The term "about," as used herein, refers to a +/−10% variation from the nominal value. It is to be understood that such a variation is always included in a given value provided herein, whether or not it is specifically referred to.

Figure 1:
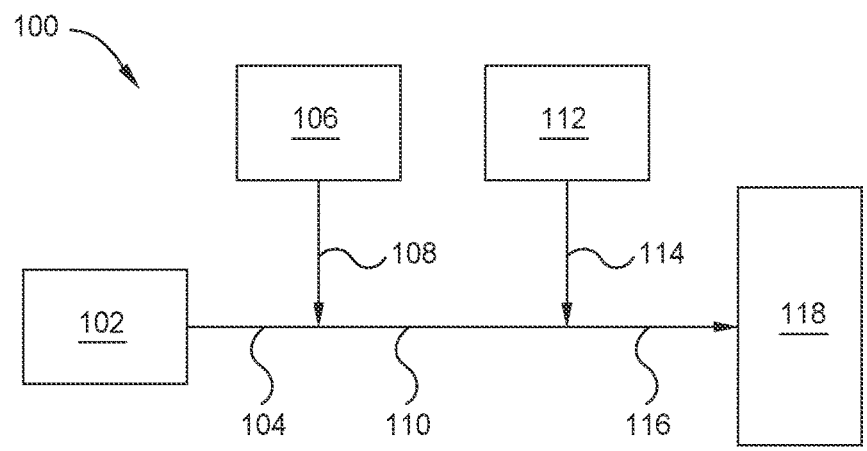
FIG. 1 illustrates a schematic of a system for transporting granular material, according to an embodiment.

A system for transporting granular material 100 is shown in FIG. 1. In one or more embodiments, the system for transporting granular material 100 can include a blower 102, a supply of dust suppression solution 106, a supply of granular material 112, and a storage container 118. The blower 102 can be or include any apparatus suitable to provide compressed air capable of transporting the granular material. The supply of dust suppression solution 106 can include any tank, vessel, or storage container containing a dust suppression solution as described herein. The supply of granular material 112 can include any container suitable for storage and supply of bulk granular material, such as hoppers granular material. In one or more embodiments, the hoppers can be mobile hoppers. Example of suitable mobile hoppers include tractor trailer beds, rail cars, or other portable proppant storage container suitable for containing a granular material as described herein. The storage container 118 can include any silo or other suitable frac sand storage container. One or more pneumatic transfer hoses, shown as lines 104, 110, 116, can be fluidically linked to each other and can provide fluid communication between the blower 102 and the storage container 118.

In one or more embodiments, the blower 102 can provide a pressured stream of air through a first transfer hose or a first section of a transfer hose, as depicted by line 104. Dust suppression solution withdrawn from the supply of dust suppression solution 106 can be introduced to the first transfer hose or first section of the transfer hose via line 108 to provide a mixture of compressed air and dust suppression solution, or dust suppression solution mixture, in a second transfer hose or a second section of the transfer hose, as depicted by line 110.

Granular material from the supply of granular material 112 via line 114 can then mix with the dust suppression solution mixture in the transfer hose represented by line 110 to provide a suspension of coated granular material in a third transfer hose or a third section of the transfer hose, as depicted by line 116. In one or more embodiments, the dust suppression solution mixture in the interior volume of the transfer hose, being under pressure, can be configured to discharge the granular material from the hopper while coating the granular material with the dust suppression solution to provide the coated granular material in the transfer hose. The suspension of coated granular material in the transfer hose represented by line 116 can then be introduced to the storage container 118. In one or more embodiments, the storage container 118 containing the coated granular material can have a reduced silica dust content in compliance with OSHA's PEL standards for respirable silica. For example, the storage container 118 containing the coated granular material can have a silica dust content of content of less than 0.1 $\mu g/m^3$.

The dust suppression solution can be or include an aqueous solution containing any suitable dust control agents, including but not limited to clay stabilizers, water soluble polymers, surfactants, gums, resins, thermoplastics, rubbers including synthetic rubbers, elastomers, thermoplastic elastomers, siloxanes, silicones and modified silicones, glycol ethers, soaps, fatty acids, epoxies, acrylic polymers, phenolics, polyurethanes, polyacrylam ides, fluoropolymers, polysiloxanes, and combinations thereof. In one or more embodiments, the dust suppression solution can include aminoethylaminopropyl polysiloxane emulsion, emulsion of dimethylhydroxyterminated siloxanes and silicones, aqueous polysiloxane emulsion, polydimethylsiloxane emulsion, alkyl branched and vinyl polysiloxanes, and combinations thereof. Any coating known to be useful to those of ordinary skill in the art can be employed, such as all those listed in the U.S. Pat. Nos. 7,270,879 and 10,668,440, each of which is incorporated by reference herein in its entirety.

In one or more embodiments, the dust control agents can be or include one or more clay stabilizers, such as metal halide salts, including but not limited to sodium chloride, calcium chloride, potassium chloride, magnesium chloride, sodium bromide, potassium bromide, calcium bromide, magnesium bromide, sodium fluoride, calcium fluoride, potassium fluoride, magnesium fluoride, sodium iodide, calcium iodide, potassium iodide, magnesium iodide, or any combination thereof. In one or more embodiments, the dust suppression solution can be or include one or more water soluble polymers, including but not limited to polyvinyl alcohol and polyacrylamide polymers.

The dust suppression solution can include the dust control agents in any suitable amounts. In one or more embodiments, the dust suppression solution can include at least 75 wt % water, at least 85 wt % water, at least 90 wt % water, or at least 95 wt % water based on the total weight of the dust suppression solution. In one or more embodiments, the dust suppression solution can include from about 0.1 wt % about 0.5 wt % about 1 wt¾, about 2 wt % or about 3 wt % to about 5 wt % about 7 wt % about 10 wt % or about 15 wt % dust control agent based on the total weight of the dust suppression solution.

Figure 2:
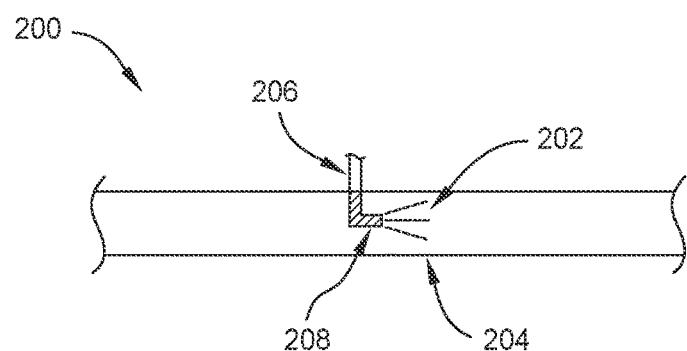
FIG. 2 illustrates a cross-sectional side view of an apparatus for mixing a dust suppression solution with compressed air, according to an embodiment.

The dust suppression solution introduced to the transfer hose via line 108 can be introduced to the transfer hose as a spray, mist, or vapor to provide the dust suppression solution mixture at line 110. In one or more embodiments, the dust suppression solution mixture can include a mist of the dust suppression solution suspended in the compressed air. FIG. 2 illustrates a cross-sectional side view of an apparatus, or misting system, 200 for mixing dust suppression solution with compressed air. The apparatus 200 can include a transfer hose 204 containing compressed, or pressurized, air. The dust suppression solution can be introduced to the transfer hose 204 via line 206 (line 206 in FIG. 2 can be the same as line 108 as depicted in FIG. 1) to provide a mixture of compressed air and dust suppression solution, or dust suppression solution mixture, in the transfer hose at line 110. The line 206 can connect to the transfer hose 204 in any suitable manner such that an interior volume of line 206 is in fluid communication with an interior volume of the transfer hose 204. A nozzle 208 can be attached to an end portion of the line 206. The nozzle 208 can be configured to cause the dust suppression solution exiting the nozzle to disperse in a spray, mist, or vapor (202) like manner into the interior volume of the transfer hose 204. The nozzle can be at least partially disposed in the interior volume of the transfer hose 204. In one or more embodiments, the end portion of the line 206 can extend into the interior volume of the transfer hose 204 such that the nozzle 208 is disposed along a centerline of the interior volume of the transfer hose 204. In other embodiments (not shown), a plurality of nozzles can be arranged along a circumference of the transfer hose 204.

The granular material can be or include proppant, sand, silica particulates, precipitated silicas, silica (quartz sand), cristobalite, mullite, alumina, silica-alumina, silica gel, mica, silicate, e.g., orthosilicates or metasilicates, calcium silicate, bauxite, kaolin, talc, zirconia, boron, fly ash, zeolites, and diatomaceous earth and combinations thereof. In one or more the granular material is frac sand.

The dust suppression solution, in some embodiments, can be deposited on or otherwise disposed on the granular material in an amount suitable to reduce dust generation. In one or more embodiments, the dust suppression solution can be present on the granular material in an amount from about 0.01 wt %, about 0.05 wt %, about 0.1 wt %, about 0.5 wt %, or about 1 wt % to about 2 wt %, about 3 wt %, about 5 wt %, or about 10 wt % base on the total weight of the granular material and dust suppression solution disposed thereon.

The suspension of coated granular material in line 116 introduced to the one or more storage containers 118 can be free or substantially free of silica dust. In one or more embodiments, the suspension of coated granular material in line 116 introduced to the one or more storage containers 118 can have a silica dust content of less than 0.1 µg/m$^3$ less than 0.05 µg/m$^3$ or less than 0.01 µg/m$^3$. For example the storage container 118 containing the coated granular material can have a silica dust content of less than 0.1 µg/m$^3$ less than 0.05 µg/m$^3$ or less 0.01 µg/m$^3$.

Figure 3:
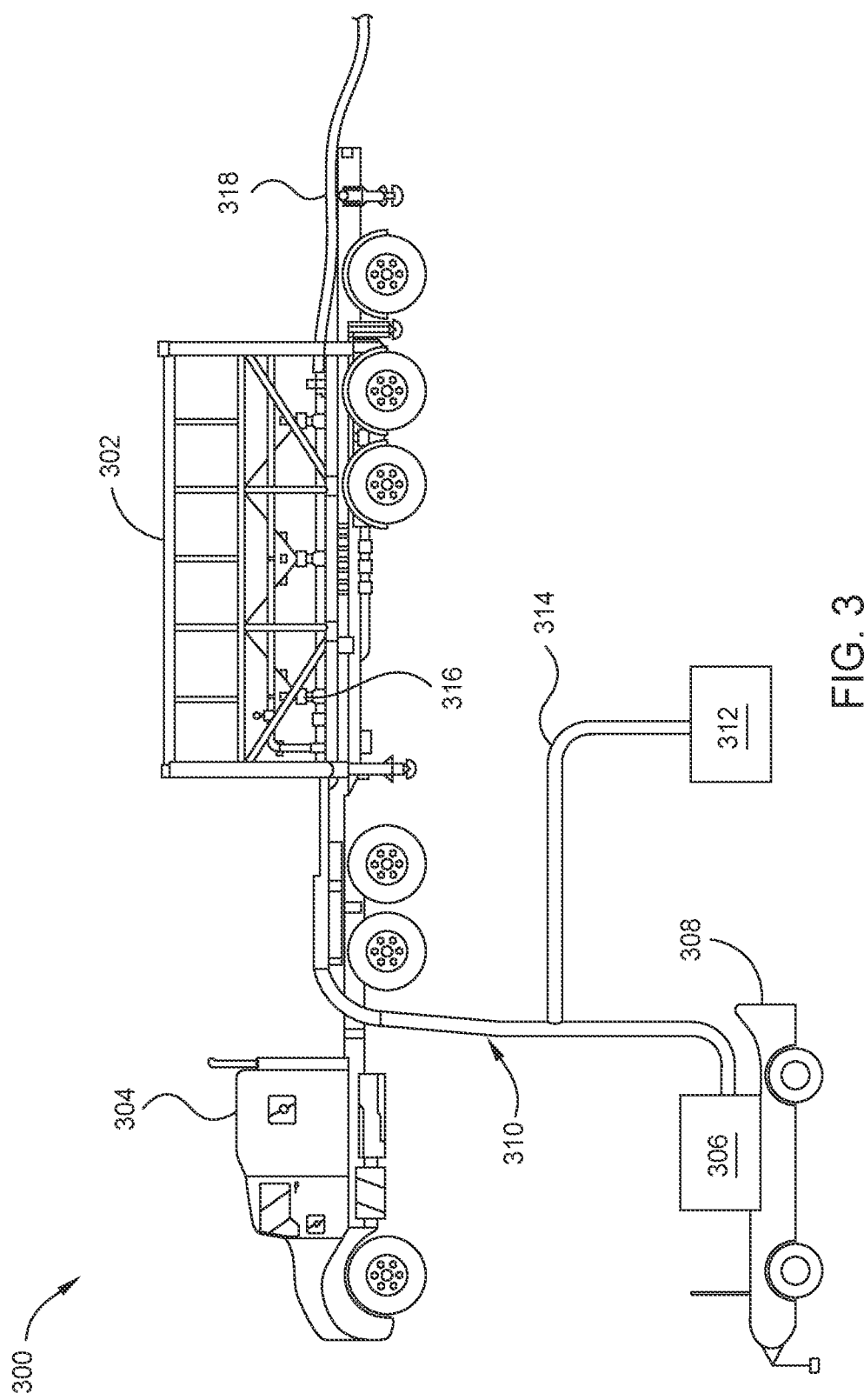
FIG. 3 illustrates a perspective side view of a system for transferring frac sand from a tractor trailer bed to a frac sand storage container located at a well site, according to an embodiment.

FIG. 3 illustrates a perspective side view of a system 300 for transferring frac sand from a tractor trailer bed 302 to a frac sand storage container located at a well site. The tractor trailer bed 302 can include any suitable bulk solids transport container transported via a truck 304, such as the framed portable storage and intermodal transportation container or tractor trailer bed 302, as shown in FIG. 3. A blower 306 can provide pressurized or compressed air through transfer hoses 310. The blower 306 can be located on the tractor trailer bed 302 or disposed on a separate, stand-alone trailer, such as trailer 308 as depicted in FIG. 3.

A dust suppression solution container 312 can also be provided at the well site to supply dust suppression solution as described herein to the transfer hose 310 via a supply line 314. In one or more embodiments (not shown), the dust suppression solution container 312 can be disposed on a separate trailer (not shown), the trailer 308 along with the blower 306, or on the tractor trailer bed 302. The dust suppression solution via line 314 can be introduced into the transfer hose 310 in any manner described herein. The supply line 314 can be connected to one or more nozzles as described herein to provide a mist of dust suppression solution throughout the compressed air (i.e., the dust suppression solution mixture described herein) into the transfer hose 310. For example, the apparatus of FIG. 2 can be incorporated into the system 300.

Pressure from the dust suppression solution mixture can cause the frac sand to be discharged from the tractor trailer bed 302 via one or more connectors 316 fluidically linking the transfer hoses 310 with the frac sand stored in the tractor trailer bed 302. The frac sand discharged from the tractor trailer bed 302 is thereby mixed with the dust suppression solution mixture to provide a fluidized suspension of coated frac sand in a discharge hose 318. The fluidized suspension of coated frac sand in the discharge hose 318 can then be introduced to one or more storage containers (not shown) located at the well site.

Figure 4:
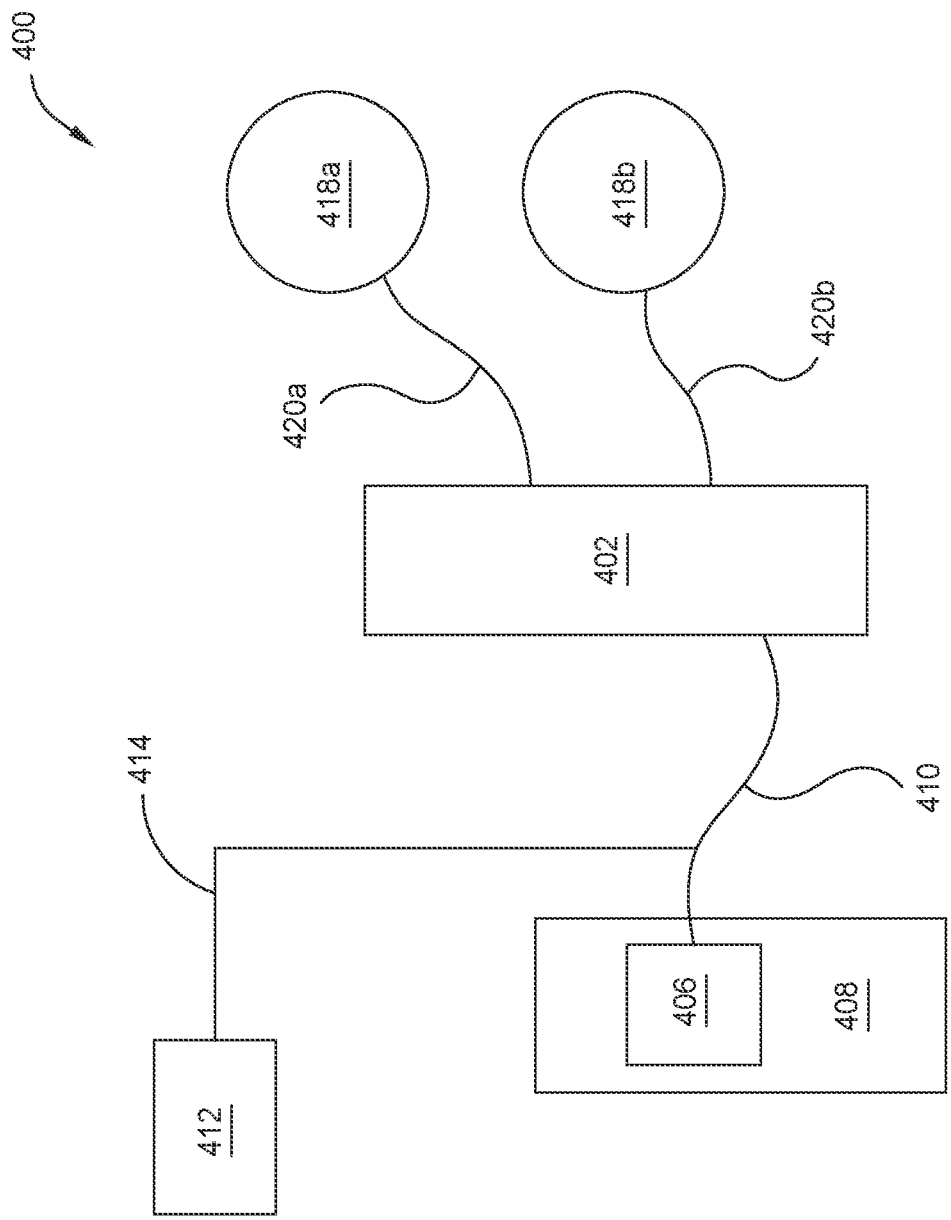
FIG. 4 illustrates an overhead view of a system for transferring frac sand from a tractor trailer bed to a silo located at a well site, according to an embodiment.

FIG. 4 illustrates an overhead view of a system 400 for transferring frac sand from a tractor trailer bed 402 to a set of silos 418a, 418b located at a well site. The blower 406 can be located on the trailer 408. A dust suppression solution container 412 can also be provided at the well site to supply dust suppression solution as described herein to the transfer hose 410 via a supply line 414 to provide a dust suppression solution mixture as described herein. Pressure from the dust suppression solution mixture can cause the frac sand to be discharged from the tractor trailer bed 402 via one or more connectors fluidically linking the transfer hoses 402 with the frac sand stored in the tractor trailer bed 402. The frac sand discharged from the tractor trailer bed 402 is immediately mixed with the dust suppression solution mixture to provide a fluidized suspension of coated frac sand in the silos 418a, 418b via lines 420a and 420b.

Figure 5:
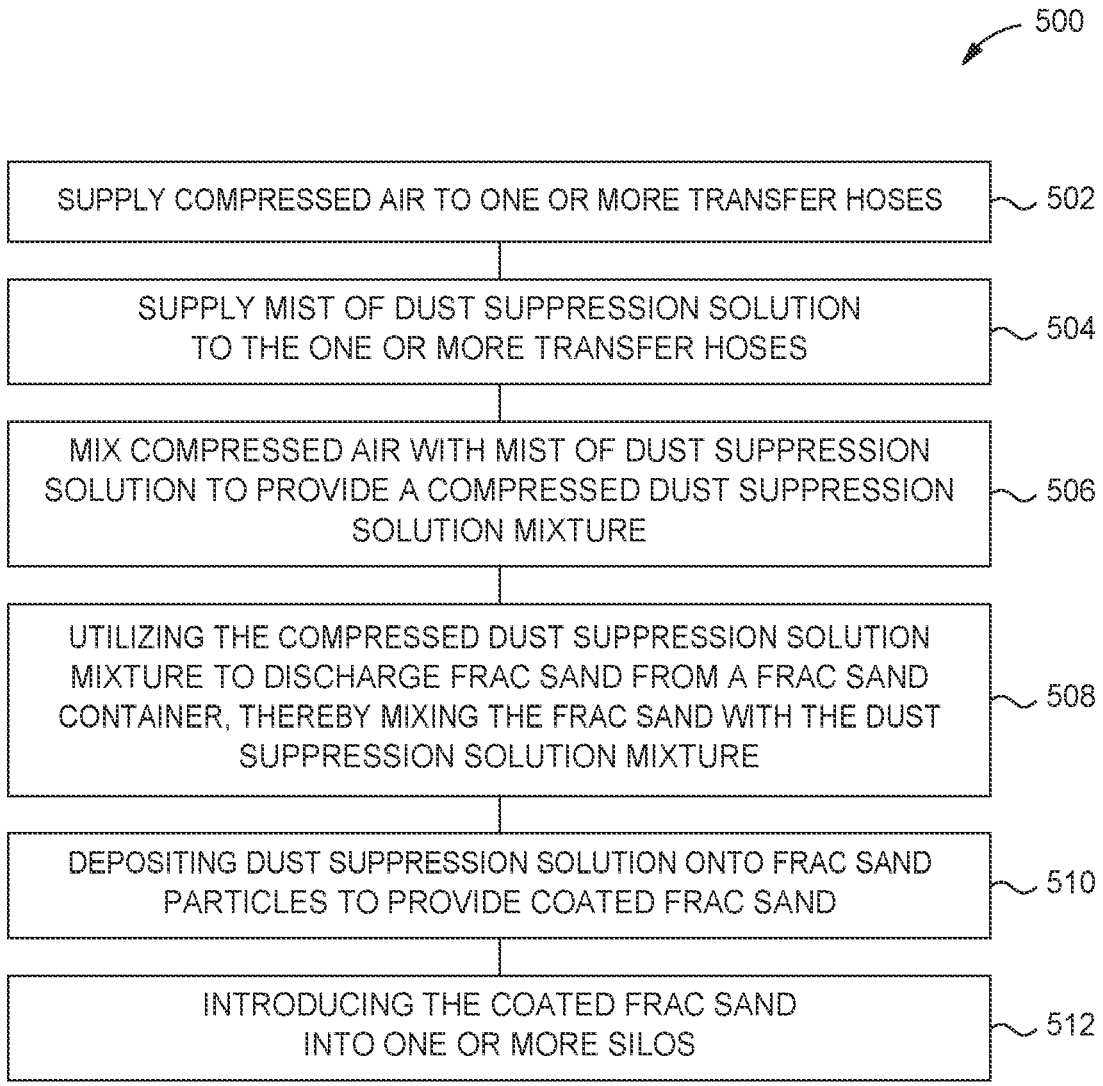
FIG. 5 is a flowchart illustrating a method for transferring frac sand from a tractor trailer bed to a silo located at a well site, according to an embodiment.

FIG. 5 is a flowchart illustrating a method 500 for transferring frac sand from a tractor trailer bed to a silo located at a well site, according to an embodiment. The method 500 can include supplying compressed air, for example, via a blower, to one or more transfer hoses, as at 502. The method 500 can also include supplying a mist of dust suppression solution to the one or more transfer hoses, as at 504. The method 500 can also include mixing the compressed air with the mist of dust suppression solution in the one or more transfer hoses to provide a compressed dust suppression solution mixture in the one or more transfer hoses, as at 506. The method 500 can also include utilizing the compressed dust suppression solution mixture to discharge frac sand from a frac sand container, such as a tractor trailer bed, thereby mixing the frac sand with the dust suppression solution in one or more transfer hoses, as at 508. The method 500 can also include depositing the dust suppression solution onto the frac sand particles to provide coated frac sand, as at 510. The method 500 can also include introducing the coated frac sand into one or more silos, as at 512.

The frac sand introduced to, the one or more silos can be free or substantially free of silica dust. In one or more embodiments, the frac sand introduced to the one or more silos can have a silica dust content of less than 0.1 µg/m$^3$ less than 0.05 µg/m$^3$ or less than 0.01 µg/m$^3$. For example the silo(s) containing the coated frac sand can have a silica dust content of less than 0.1 µg/m$^3$, less than 0.05 µg/m$^3$, or less than 0.01 µg/m$^3$.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for transporting a granular material, comprising:
   a blower,
   a first transfer hose having a first end connected to the blower and a second end connected to a hopper comprising the granular material, the first transfer hose having an interior volume;
   a supply of dust suppression solution in fluid communication with the interior volume of the first transfer hose upstream of the hopper, the dust suppression solution comprising a dust control agent in an amount of about 0.1 wt % to about 15 wt % and water in an amount of at least 75 wt % based on total weight of the dust suppression solution, the dust suppression solution coating the granular material; and
   a second transfer hose having a first end coupled to the hopper and a second end coupled to a storage container, the second transfer hose facilitating pneumatic transport of coated granular material into the storage container.

2. The system of claim 1, wherein the supply of dust suppression solution is fluidically linked to the interior volume of the first transfer hose via a nozzle.

3. The system of claim 2 wherein the nozzle is configured to provide a mist of the dust suppression solution in the interior volume of the first transfer hose.

4. The system of claim 3, wherein the mist is at least substantially homogeneously mixed with the compressed air to provide a dust suppression solution mixture in the interior volume of the first transfer hose.

5. The system of claim 4, wherein the dust suppression solution mixture in the interior volume of the first transfer hose is configured to discharge the granular material from the hopper and to coat the granular material with the dust suppression solution to provide a coated granular material in the first transfer hose.

6. The system of claim 5, further comprising a granular material storage container in fluid communication with the second transfer hose, wherein the granular material storage container is configured to receive the coated granular material, and wherein the granular material storage container containing the coated granular material has a silica dust content of less than 0.1 µg/m$^3$.

7. The system of claim 1, wherein the blower is configured to provide compressed air into the interior volume of the first transfer hose.

8. The system of claim 1, wherein the dust suppression solution is introduced into the interior volume of the transfer hose upstream of the hopper and the dust suppression solution is used to discharge the granular material from the hopper into a second transfer hose in a manner sufficient to coat the granular material with the dust suppression solution to provide a coated granular material in the second transfer hose.

9. The system of claim 8, wherein the coated granular material in the second transfer hose has a silica dust content of less than 0.1 µg/m$^3$.

10. A system for transferring frac sand from a tractor trailer bed to a silo located at a well site, comprising:
a first transfer hose having a first end and a second end, the first transfer hose having a first interior volume;
a misting system in fluid communication with the first interior volume of the first transfer hose upstream of the tractor trailer bed, the misting system comprising a supply of a dust suppression solution and the dust suppression solution comprises a dust control agent in an amount of about 0.1 wt % to about 15 wt % and water in an amount of at least 75 wt % based on total weight of the dust suppression solution, the dust suppression solution coating the frac sand;
a blower connected to the first end of the first transfer hose;
a second transfer hose having a first end and a second end, the second transfer hose having a second interior volume and facilitating pneumatic transport of coated frac sand;
a tractor trailer connected to the second end of the first transfer hose and the first end of the second transfer hose; and
a silo connected to the second end of the second transfer hose that receives the coated frac sand.

11. The system of claim 10, wherein the misting system comprises a supply of a dust suppression solution in fluid communication with the first interior volume of the first transfer hose via a nozzle configured to provide a mist of the dust suppression solution in the first interior volume.

12. The system of claim 11, wherein the blower is configured to provide compressed air into the interior volume of the transfer hose and the mist is at least substantially homogeneously mixed with the compressed air to provide a dust suppression solution mixture in the first interior volume.

13. The system of claim 12, wherein the dust suppression solution mixture in the first interior volume of the first transfer hose is configured to discharge the frac sand from the hopper into the second transfer hose in a manner sufficient to coat the frac sand with the dust suppression solution to provide a coated frac sand in the second interior volume of the second transfer hose.

14. The system of claim 13, wherein the silo is configured to receive the coated frac sand from the second transfer hose, and wherein an interior volume of the silo has a silica dust content of less than 0.1 µg/m$^3$ when the coated frac sand is being introduced into the silo.

15. The system of claim 13, wherein the coated frac sand in the second interior volume of the second transfer hose has a silica dust content of less than 0.1 µg/m$^3$.

16. The system of claim 11, wherein the dust control agent comprises clay stabilizers, water soluble polymers, surfactants, gums, resins, thermoplastics, rubbers including synthetic rubbers, elastomers, thermoplastic elastomers, siloxanes, silicones and modified silicones, glycol ethers, soaps, fatty acids, epoxies, acrylic polymers, phenolics, polyurethanes, polyacrylamides, fluoropolymers, or polysiloxanes or any combination thereof.

17. The system of claim 11, wherein at least a portion of the nozzle is disposed in the first interior volume of the first transfer hose.

18. The system of claim 10, wherein the tractor trailer bed comprises a hopper connected to the second end of the first transfer hose, wherein the hopper contains the frac sand.

19. A method for transferring frac sand from a tractor trailer bed to a silo located at a well site, comprising:
introducing compressed air into an interior volume of a first transfer hose via a blower;
introducing a dust suppression solution into the interior volume of the first transfer hose upstream of the tractor trailer bed, the dust suppression solution comprises a dust control agent in an amount of about 0.1 wt % to about 15 wt % and water in an amount of at least 75 wt % of the total weight of the dust suppression solution;
mixing the compressed air with the dust suppression solution to provide a compressed dust suppression solution mixture;
contracting the compressed dust suppression solution mixture with frac sand to provide a coated frac sand; and
pneumatically transporting introducing the coated frac sand into a silo via a second transfer hose.

20. The method of claim 19, wherein the dust suppression solution is introduced into the interior volume of the first transfer hose as a mist.

21. The method of claim 19, wherein the dust control agent comprises clay stabilizers, water soluble polymers, surfactants, gums, resins, thermoplastics, rubbers including synthetic rubbers, elastomers, thermoplastic elastomers, siloxanes, silicones and modified silicones, glycol ethers, soaps, fatty acids, epoxies, acrylic polymers, phenolics, polyurethanes, polyacrylamides, fluoropolymers, or polysiloxanes, or any combination thereof.

22. The method of claim 19, wherein the coated frac sand comprises dust suppression solution in an amount of about 0.01 wt % to about 5 wt % based on the total weight of the coated frac sand.

23. The method of claim 19, wherein the silo containing the coated frac sand has a silica dust content of less than 0.1 µg/m$^3$ when the coated frac sand is being introduced into the silo.

24. The method of claim 19, wherein the dust suppression solution is introduced into the first interior volume of the transfer hose upstream of the tractor trailer bed and the compressed dust suppression solution mixture is used to discharge the frac sand from the tractor trailer bed to the silo.

25. The method of claim 19, wherein the coated frac sand has a silica dust content of less than 0.1 µg/m$^3$.

\* \* \* \* \*

UNITED STATES PATENT AND TRADEMARK OFFICE
CERTIFICATE OF CORRECTION

PATENT NO. : 12,421,059 B2  
APPLICATION NO. : 17/681428  
DATED : September 23, 2025  
INVENTOR(S) : Matthew Wilks Page 1 of 1

It is certified that error appears in the above-identified patent and that said Letters Patent is hereby corrected as shown below:

In the Specification

Column 3, Detailed Description, Line 53 Delete "polyacrylam ides," and insert -- polyacrylamides, -- therefor Column 4, Detailed Description, Line 16 Delete "wt¾," and insert -- wt %, -- therefor In the Claims Column 8, Claim 19, Line 55 after "transporting" delete "introducing"

Signed and Sealed this  
Second Day of December, 2025

John A. Squires  
*Director of the United States Patent and Trademark Office*